United States Patent [19]

Shaw

[11] Patent Number: 4,586,624

[45] Date of Patent: May 6, 1986

[54] METHOD AND DEVICE FOR HEAT SEALING THERMOPLASTICS MATERIALS

[75] Inventor: Mark D. Shaw, Orange Park, Fla.

[73] Assignee: Bondico, Inc., Jacksonville, Fla.

[21] Appl. No.: 638,556

[22] Filed: Aug. 7, 1984

[51] Int. Cl.⁴ ............................................. B29C 65/00
[52] U.S. Cl. .................................... 220/67; 29/469.5;
29/526 R; 156/69; 156/273.9; 156/306.6;
220/319; 220/359; 264/27; 264/248
[58] Field of Search ...................... 156/69, 293, 273.9,
156/274.2, 273.9, 306.6; 264/25, 26, 27, 248;
425/3, DIG. 13; 428/76, 379; 219/549, 544,
535, 548, 551; 220/67, 319, 359; 29/469.5, 526 R

[56] References Cited

U.S. PATENT DOCUMENTS

| | | | |
|---|---|---|---|
| 2,274,839 | 3/1942 | Marick | 219/549 |
| 2,744,655 | 5/1956 | Vnuk | 156/273.9 |
| 2,795,348 | 6/1957 | Kunik | 220/67 |
| 2,802,593 | 8/1957 | Slaughter | 156/69 |
| 3,079,458 | 2/1963 | Hedstrom | 219/549 |
| 3,084,242 | 4/1963 | Vogler et al. | 219/549 |
| 3,095,112 | 6/1963 | Weinstein et al. | 220/67 |
| 3,305,668 | 2/1967 | Smith | 219/549 |
| 3,348,640 | 10/1967 | Thompson et al. | 156/273.9 |
| 3,852,570 | 12/1974 | Tyler | 219/549 |
| 4,110,145 | 8/1978 | Lombardi | 156/273.9 |
| 4,436,988 | 3/1984 | Blumenkranz | 219/544 |
| 4,470,193 | 9/1984 | Karel et al. | 219/544 |
| 4,493,985 | 1/1985 | Keller | 219/544 |

Primary Examiner—Willard E. Hoag
Attorney, Agent, or Firm—Wigman & Cohen

[57] ABSTRACT

A method and device for heat sealing thermoplastic materials is disclosed. A pair of flat resistance wires are encased within a plastic sheath and arranged in parallel with their flat surfaces lying in one plane. The wires are spaced from each other in a manner designed for maximum thermal emission. To weld together two thermoplastic materials, the sheathed wires are held between and in firm contact with the materials to be joined. A predetermined electric current is passed through the wires until enough heat has been generated to weld the materials together. The invention may also be applied to a process for heat sealing plastic lids to plastic drums. In particular, the sheathed wires are fastened to the lower surface of a thermoplastic drum lid. The lid, together with the resistance wires is clamped to a thermoplastic drum with a standard drum clamp. An electric current is passed through the wires for a period of time sufficient to heat up the wires and weld the lid to the drum.

13 Claims, 5 Drawing Figures

U.S. Patent    May 6, 1986    4,586,624
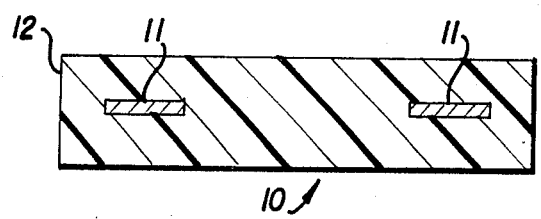
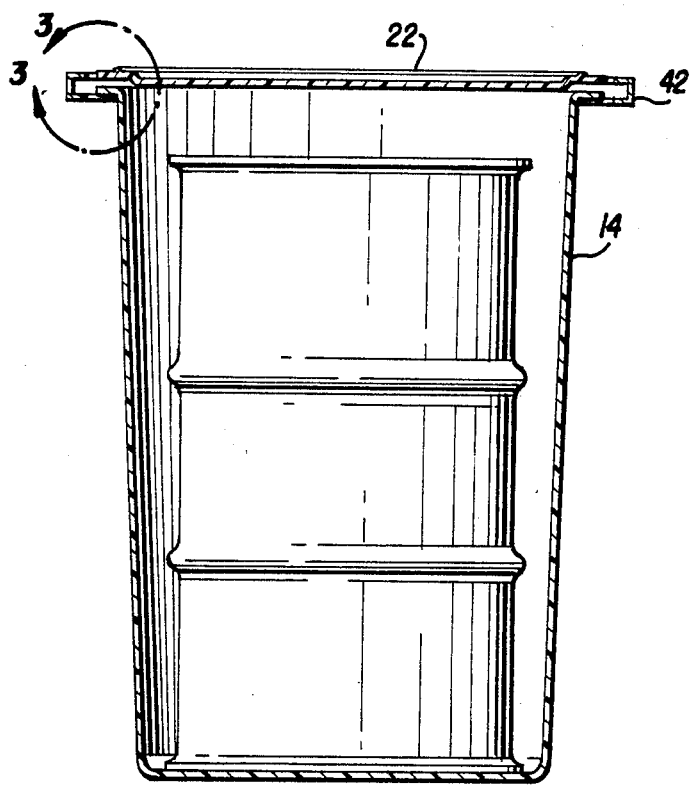
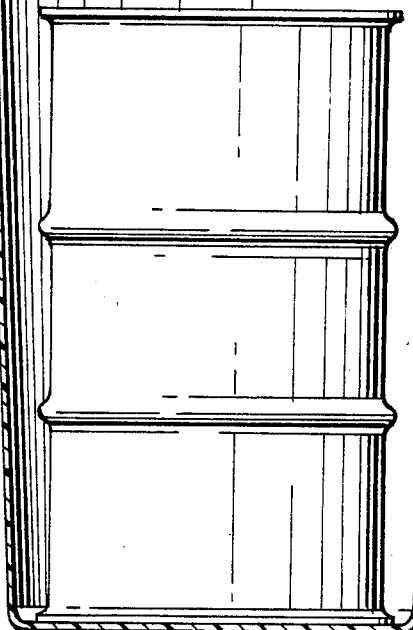
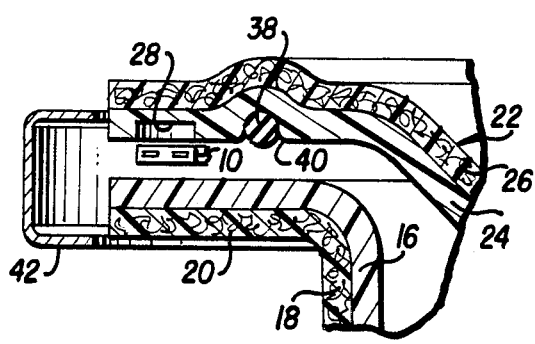
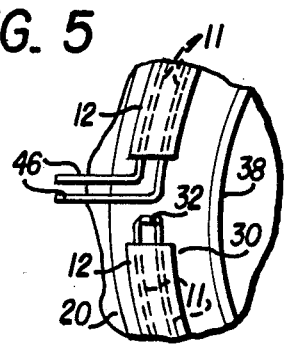
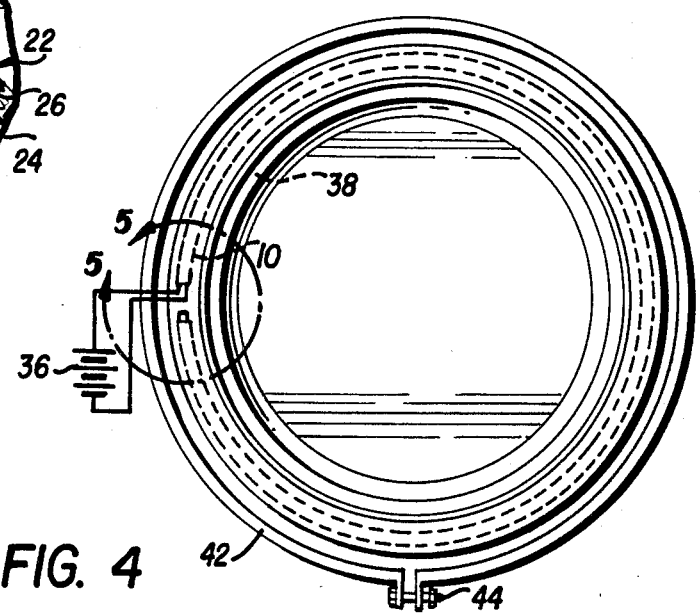

METHOD AND DEVICE FOR HEAT SEALING THERMOPLASTICS MATERIALS

BACKGROUND OF THE INVENTION

The present invention relates to a method of and a device for heat sealing thermoplastic materials together, and in particular, a method and device for heat sealing a thermoplastic lid to a thermoplastic drum designed for the disposal of hazardous wastes.

A search of the prior art failed to uncover any prior art references which disclose the method or device of the present invention. A number of patents were uncovered which disclose methods or devices for heat sealing or bonding methods in general.

U.S. Pat. No. 4,349,219 discloses a welding muff of thermoplastic material which forms a sleeve around two pipe parts that are to be joined. A resistance wire within the muff welds the interior surface of the muff to the exterior surfaces of the pipe parts.

U.S. Pat. No. 4,029,837 discloses a composite plastic-metallic bonding means and method comprising a metallic mesh interposed between first and second layers which are inserted between first and second bodies. The metal mesh is heated by exposing it to an alternating magnetic field. The heated mesh melts layers and forms a seal between the first and second bodies.

U.S. Pat. No. 2,961,363 discloses a method for coupling thermoplastic components comprising a hollow ring of an exothermic autocombustible substance which is placed between the two thermoplastic components to be coupled. Ignition of the exothermic autocombustible substance heats the thermoplastic components and welds them together.

U.S. Pat. No. 4,106,969 discloses a method of joining a thermoplastic material to an inorganic material comprising heating a helical coil and partially embedding it in the thermoplastic material and then gluing the inorganic material to the thermoplastic material using the helical coil as an anchor for the adhesive.

Because of inherent structural limitations or flammability problems, the above methods and devices are not suitable for welding thermoplastic materials or for sealing and storing hazardous waste materials.

In recent times, the disposal of hazardous waste material has become a significant problem. Nearly 270 million tons of hazardous waste material is generated each year. Presently, the waste material is typically disposed of by placing it in either a metallic or plastic container. The metallic containers are unsuitable because they are subject to corrosion and leakage when exposed to the elements for a period of time.

To avoid the corrosion problems associated with metal containers, hazardous waste materials, such as solid hazardous wastes in bulk or particulate form, dewatered hazardous sludges, or hazardous wastes that have been stabilized through solidification/cementation processes, are frequently stored in plastic containers. The presently used plastic containers are closed by a conventional metal clamp holding the lid to the drum. It has been suggested that waste material originally placed in a metal container may then be placed in a plastic container.

It has also been suggested to heat seal plastic drums by suspending a heating plate between the plastic drum and a plastic lid that is suspended above the heating plate. When the top of the drum and the bottom of the lid reach a predetermined temperature, the plate is removed and the lid is pressed onto the drum to complete the seal.

Both methods for sealing the plastic containers are disadvantageous. The metal clamp is prone to corrosion or rusting and the heating plate method is awkward to use and requires expensive capital equipment.

SUMMARY AND OBJECTS OF THE INVENTION

In view of the foregoing limitations and shortcomings of the prior art, as well as other disadvantages not specifically mentioned above, it should be apparent that there still exists a need in the art for an efficient and effective means of heat sealing thermoplastic materials, and in particular for heat sealing thermoplastic lids onto drums. It is, therefore, a primary objective of this invention to fulfill that need by providing an economical device for heat sealing thermoplastic materials together with maximum efficiency.

More particularly, it is an object of this invention to provide a resistance wire device for heat sealing two thermoplastic materials together using a minimal amount of capital equipment.

A further object of the present invention is to provide a means for heat sealing materials together with a resistance wire, wherein shifting of the wire during the heating process is prevented.

It is yet another object of the invention to provide a system for heat sealing plastic drums that would result in a weld of consistent quality.

It is a further object to provide a low cost method of converting a salvage drum to an encapsulate drum.

It is still another object of the invention to encapsulate a pair of flat ribbon resistance wires in a thermoplastic sheath in such a manner that the wires remain positioned in fixed relation to each other so that they heat the surrounding sheath with maximum thermal efficiency.

A further object of the present invention is to provide a means for heat sealing a lid to a drum wherein the heat sealing means is attached to the drum lid and remains in situ after sealing.

It is yet another object of the present invention to provide a means for heat sealing a lid to a drum wherein the heating means is sealingly isolated from the contents of the drum.

Briefly described, the aforementioned objects are accomplished according to the invention by providing a pair of flat ribbon resistance wires within a thermoplastic sheath. The flat wires have a width substantially greater than the thickness thereof. The wires are arranged in side-by-side, substantially coplanar relation to each other in a manner designed to emit heat to the surrounding thermoplastic sheath with maximum thermal efficiency.

To weld together two thermoplastic elements, the sheathed wires are disposed between and in firm contact with the two elements to be joined. A predetermined electric current is passed through the wires until enough heat has been generated to weld or thermally bond the thermoplastic elements together.

A further aspect of the present invention involves the application of the sheathed resistance wires to a process for heat sealing plastic lids to plastic drums. In particular, the sheathed wires are fastened to the lower surface of a thermoplastic drum lid adjacent the outer perimeter thereof. A groove is formed in the lid in an annular path radially within, yet adjacent to, the sheathed wire. An annular seal, such as an O-ring is placed in the groove to prevent flammable gases or materials within the drum from contacting the welding area.

The lid, together with the resistance wires and the O-ring, is clamped to the upper lip or flange of a thermoplastic drum with a standard drum clamp. An electric current is passed through the wires for a period of time sufficient to heat up the wires, melt the thermoplastic sheath and weld the lid to the drum. The wires are then disconnected from the electric current and the sealed drum is ready for disposal.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a cross-sectional view of the heat sealing device of the invention with resistance wires encased in a plastic sheath;

FIG. 2 is a cross-sectional view of a plastic drum and lid of the present invention with a metal drum therein;

FIG. 3 is a detailed cross-sectional view of the circled portion of FIG. 2;

FIG. 4 is a top plan view of the lid clamped to a drum; and

FIG. 5 is a detailed view of the circled portion of FIG. 4 as viewed from the underside of the lid.

DETAILED DESCRIPTION OF A PREFERRED EMBODIMENT

Referring now in detail to the drawings wherein like parts are designated by like reference numerals throughout, there is illustrated in FIG. 1 a cross-sectional view of the heat sealing device of the present invention which is designated by reference numeral 10. The device 10 comprises a pair of flat resistance wires 11 encased in a thermoplastic sheath 12.

The wires 11 have a width substantially greater than the thickness thereof. In one preferred form, the wires are about 0.0625 inches wide and 0.0045 inches thick. The wires are preferably made from nickel-chromium and have a resistance of approximately 2 ohms per linear foot.

The sheath 12 may be made of any suitable thermoplastic material, preferably polyethylene, and may be formed by drawing the wires 11 in spaced, parallel relation through a specially designed extruder die wherein molten polyethylene is extruded around the wires to form the sheath. For some applications, such as sealing plastic drums, it may be advantageous to draw the sheath and wires so that the heat sealing device 10 is arcuate or circular in shape, as is shown in FIG. 4.

The heat sealing device 10 may also be fabricated by rolling a pair of flat resistance wires 11 between a pair of thin strips of polyethylene which have been heated sufficiently to weld the strips of polyethylene together around the wires and thereby encapsulate the wires. Whether the heat sealing device is fabricated by extrusion, rolling or any other process, the wires are preferably arranged in side by side, substantially coplanar relation to one another, as can be seen in FIG. 1, and are preferably spaced apart 2 to 3 times the width of the wire for maximum thermal efficiency. It is also possible to form the heat sealing device of the invention with only one flat resistance wire in the sheath instead of two.

To weld two thermoplastic elements together, the elements are clamped or held together with the heat sealing device 10 interposed between them such that the wider, flat surfaces of the wires confront the surfaces of the elements to be welded together. Electric leads are clipped to the wire ends and a predetermined electric current is passed through the resistance wires to generate heat therein. Connecting 120 volts AC across a fourteen foot length of 2 ohm/foot wire for three or four minutes will raise the sheath temperature to about 300°–400° F., which is sufficiently hot to melt the polyethylene and weld or thermally bond the two thermoplastic elements together. The current source is then disconnected and the welded materials are allowed to cool. Because the wires 10 are in a sheath 12, they are not likely to shift due to expansion during the welding process.

The above-described device and method for welding plastic materials together is especially suitable for plastic encapsulation drums for hazardous waste disposal. In FIGS. 2 and 3, there is shown such an encapsulation drum 14, which comprises an inner layer 16 of polyethylene of about 0.125 inches thick, and an outer layer 18 of fiberglass, also about 0.125 inches thick. The means for bonding the polyethylene to the fiberglass are well known and are not considered a part of the invention. The drum has a flange or lip 20 extending horizontally from the top thereof. The drum walls are tapered to allow a plurality of drums to be stacked within one another. Preferably, the drum is a 95 gallon size so that a 55 gallon metal drum is easily contained therein.

A lid 22 designed to fit on the drum 14 is also shown in FIGS. 2 and 3. In a manner similar to the drum, the lid 22 is made from a 0.125 inch layer 24 of polyethylene bonded to a 0.125 inch layer 26 of fiberglass. The lid 22 is recessed in its center so that it fits within and is located by the drum flange 20. The heat sealing device 10 is attached to the underside of the outer peripheral edge of the lid 22 by welding the device to the lid surface, for instance, with a hand welding tool, or by any other suitable method. A groove 28 may be formed in the lid to facilitate the placement of the device 10.

As best seen in FIG. 5, at one end 30 of the plastic sheath 12, the wires 11 are electrically interconnected by a short piece of flat wire 32 or by any other electrically conductive means, such as a shorting bar or by folding or twisting the wires 11 together. At the other end 34 of the sheath 12, the ends of the wires 10 are connected a source 36 of electricity by connecting conventional leads (not shown in detail) to the ends 46 of the wires 11. Preferably, the electric source provides 120 volt AC current, although alternative embodiments may be designed to run from other sources of electricity, such as a 12 volt DC car battery 36 (FIG. 4) or generator.

A circular O-ring 38, preferably of silicone rubber, is located in an annular groove 40 formed in the lower surface of the lid adjacent, but interior to, the heat sealing device 10. The purpose of the O-ring is to enhance the seal between the drum 14 and lid 22. This is particularly important if there are flammable materials being sealed within the drum, in that the O-ring 38 will prevent the flammable material from coming into contact with the weld area. A standard drum clamp 42 is fitted over the drum flange 20 and lid 22 and holds them together when tightened by bolt 44 (FIG. 4).

Hazardous waste materials that are not reactive with polyethylene can be placed directly within the drum 14. However, if the waste materials will react with or corrode polyethylene, they can be first sealed within a conventional metal drum 46, which can be placed within the polyethylene/ fiberglass drum 14.

After the waste materials have been placed in the drum 14, lid 22 is clamped in place by clamp 42 with the ends 46 of wires 10 extending outside the drum. An electric current is applied to the wire ends 46, as shown in FIG. 4. It has been found that satisfactory results are achieved when using a fourteen foot length of 2 ohm-/foot, with the wires spaced 0.125–0.1875 inches apart and a 120 volt source is applied for about three minutes. Fourteen feet is the total length of the resistance wire 11, which is actually twice the length of the sheath 12, since the two wires in the sheath are interconnected at one end and thus form a single circuit that doubles back on itself.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A sealable container comprising:
   a drum having a thermoplastic wall and an open end;
   a lid of thermoplastic material adapted to close the open end of the drum; and
   at least a first flat ribbon resistance wire encapsulated in a thermoplastic sheath, said flat wire having a substantially rectangular cross-section with two planar sides of said wire forming the longer sides of said rectangular cross-section and two edges of said wire forming the shorter sides of said rectangular cross-section, said encapsulated wire being interposed between the open end of said drum and said lid and being disposed as an annular ring with the two planar surfaces of the wire in parallel relation to the confronting surfaces of the lid and drum and with one of the two edges of said wire being positioned at a first diameter of said annular ring and the other of the two edges of said wire being positioned at a second diameter of said annular ring greater than the first diameter.

2. The sealable container according to claim 1 further comprising an annular flange extending from the open end of the drum, said encapsulated wire being disposed between the lid and the flange.

3. The sealable container according to claim 2 including an annular groove disposed in one of said lid or the flange of said drum, said encapsulated wire being disposed in said groove.

4. The sealable container according to claim 1 further comprising a second flat ribbon resistance wire encapsulated in said thermoplastic sheath, said second wire being arranged in side-by-side, substantially coplanar relationship with said first wire.

5. The sealable container according to claim 4, wherein one end of the first wire is conductively connected to one end of the second wire and the other ends of said first and second wires are adapted to be connected to a source of electrical current.

6. The sealable container according to claim 1, further comprising an elastomeric seal disposed between the drum lid and drum flange, said seal being disposed radially inwardly with respect to said encapulated wire.

7. The sealable container according to claim 4, wherein said wire has a width to thickness ratio of about 14.

8. The sealable container according to claim 4, wherein said wires are spaced from each other a distance equal to at least twice their width.

9. The sealable container according to claim 1, wherein said wire is made of nickel-chromium and has a resistance of about 2 ohms per linear foot.

10. The sealable container according to claim 1, wherein said sheath is extruded around said wire.

11. A method of welding a thermoplastic lid to a thermoplastic drum to seal contents of the drum therein comprising the steps of:
    forming at least one flat ribbon resistance wire encapsulated in a thermoplastic sheath into a ring, said flat wire having a substantially rectangular cross-section with two planar sides of said wire forming the longer sides of said rectangular cross-section and two edges of said wire forming the shorter sides of said rectangular cross-section said planar sides forming the flat sides of said ring inserting said encapsulated wire between confronting surfaces of said lid and drum with each of said planar sides said wire confromting a respective one of the lid and drum and the thermoplastic sheath contacting the drum and lid; disposing said encapsulated wire as an annular ring with the two planar surfaces of the wire in parallel relation to the confronting surfaces of the lid and drum and with one of the two edges of said wire being positioned at a first diameter of said annular ring and the other of the two edges of said wire being positioned at a second diameter of said annular ring greater than the first diameter; and passing a predetermined electrical current through the resistance wire to theat the wire, melt the thermoplastic sheath and weld the drum and lid to each other at the confronting surfaces thereof.

12. The method according to claim 11, including the step of attaching the encapsulated wire to the lid when forming said encapsulated wire into said annular ring by welding the thermoplastic sheath to the lid prior to the step of passing current through said wire.

13. The method according to claim 11, including the step of clamping the lid to the drum prior to the step of passing current through said wire.

* * * * *